US010826778B2

(12) United States Patent
Knechtel et al.

(10) Patent No.: US 10,826,778 B2
(45) Date of Patent: Nov. 3, 2020

(54) DEVICE DISCOVERY SERVICE

(71) Applicant: SAP SE, Walldorf (DE)

(72) Inventors: Martin Knechtel, Dresden (DE); Axel Schroeder, Dresden (DE)

(73) Assignee: SAP SE, Walldorf (DE)

( * ) Notice: Subject to any disclaimer, the term of this patent is extended or adjusted under 35 U.S.C. 154(b) by 94 days.

(21) Appl. No.: 15/370,907

(22) Filed: Dec. 6, 2016

(65) Prior Publication Data

US 2018/0159740 A1 Jun. 7, 2018

(51) Int. Cl.
*H04L 12/24* (2006.01)

(52) U.S. Cl.
CPC ............ *H04L 41/12* (2013.01); *H04L 41/046* (2013.01); *H04L 41/0853* (2013.01)

(58) Field of Classification Search
CPC ... H04L 41/12; H04L 41/0866; H04L 41/046; H04L 41/0853; H04L 61/25; H04L 67/12; H04L 12/2803; H04L 61/15; H04L 67/30
USPC .......................................................... 709/223
See application file for complete search history.

(56) References Cited

U.S. PATENT DOCUMENTS

| | | | | |
|---|---|---|---|---|
| 2014/0279971 | A1* | 9/2014 | Bobick | G06F 16/951 707/693 |
| 2014/0357269 | A1* | 12/2014 | Zhou | H04W 76/14 455/434 |
| 2015/0156270 | A1* | 6/2015 | Teraoka | G06F 13/00 709/219 |
| 2015/0373123 | A1* | 12/2015 | Warrick | H04L 67/141 709/228 |
| 2016/0019294 | A1* | 1/2016 | Dong | G06F 16/367 707/794 |
| 2016/0125084 | A1* | 5/2016 | Yoo | G06F 16/245 707/741 |
| 2017/0006455 | A1* | 1/2017 | Cho | H04W 4/70 |
| 2017/0195267 | A1* | 7/2017 | Ghafourifar | H04L 51/066 |
| 2017/0289225 | A1* | 10/2017 | Snyder | H04L 65/601 |
| 2017/0289255 | A1* | 10/2017 | Urquhart | H04L 67/12 |
| 2017/0316065 | A1* | 11/2017 | Fourney | G06F 16/9535 |

* cited by examiner

*Primary Examiner* — Patrice L Winder
*Assistant Examiner* — Aye M Aung
(74) *Attorney, Agent, or Firm* — Schwegman Lundberg & Woessner, P.A.

(57) ABSTRACT

Methods, systems, and computer program products for discovering network connected devices are described. A semantic query for a network connected device is parsed, with the semantic query identifying one or more capabilities of a desired network connected device. A network address of a network connected device satisfying the parsed semantic query is identified and a query response identifying the network address of the network connected device is provided.

20 Claims, 10 Drawing Sheets

320

454 458 462 466 470 474

| IDENTIFIER | TYPE | CAPABILITIES | COMMUNICATIONS | ADDRESS |
|---|---|---|---|---|
| 100 | SERVER | TEMPERATURE | HOMEKIT | XX.10.10.10 |
| 101 | WEBCAM | CAMERA | XMPP | webcam@ example.com |
| 102 | CLIENT | WEATHER | BLUETOOTH | 01-23-45-67-89-ab |
| 103 | SERVER | TRAFFIC MAP | HTTP | http://example.com/cam |
| 104 | SENSOR | AIR QUALITY | MQTT | example.com:1883 |
| 105 | CLIENT | THERMOSTAT | HOMEKIT | XX.10.10.11 |
| 106 | SENSOR | WATER TEMP. | HOMEKIT | XX.10.10.12 |
| 107 | CAMERA | TRAFFIC CAM | XMPP | traffic.cam@ example.com |
| | | | | |
| | | | | |
| | | | | |

DEVICE DISCOVERY SERVICE

FIELD

The present disclosure relates generally to discovering network connected devices. In an example embodiment, the disclosure relates to discovering network connected devices based on a descriptive query.

BACKGROUND

The Internet of Things (IoT) is providing network connectivity to a myriad of devices. Smartphones, tablet computers, household appliances, web cameras, industrial equipment, sensors (such as weather sensors), and the like are being connected by networks and made available to network users. Some devices, such as weather sensors, traffic cameras, and the like, are made available to the general public. Other devices are available only to authorized users. Discovering, locating, and connecting to these devices can often be a challenge to even the most experienced users.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
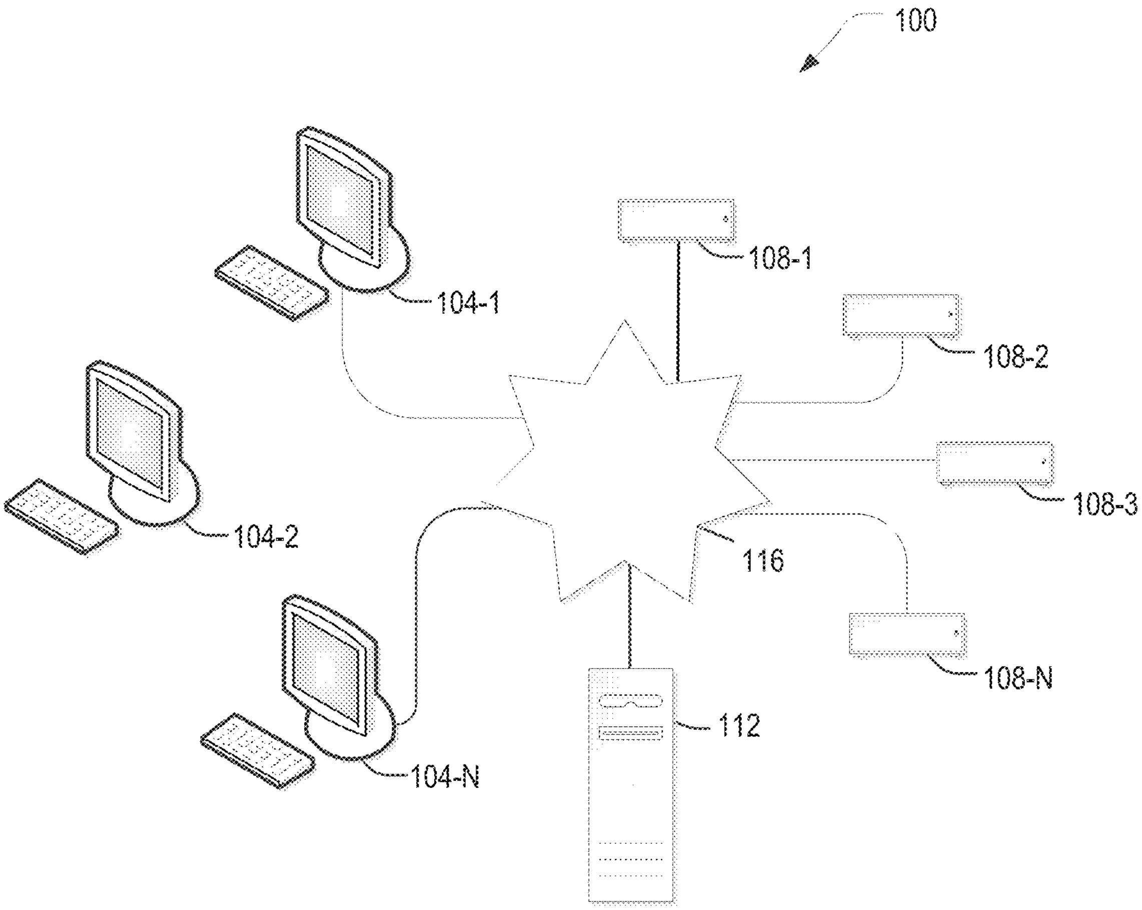
FIG. 1 is a block diagram of an example device discovery system for discovering network connected devices, in accordance with an example embodiment.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for discovering network connected devices, such as devices of the Internet of Things, are described. The Internet of Things is the internetworking of physical devices, appliances, vehicles, factories, buildings, and other items. The network connected devices may be embedded with electronics, software, sensors, actuators, network connectivity, and the like that enable these objects to collect, receive, create, and exchange data. Thus, the disclosed network connected devices may be inter-related network connected devices. The ability to discover and directly access a network connected device enables a client to efficiently access data from the device without traversing an intervening website, may give the client access to more comprehensive data that may be filtered or processed by an intervening website, and may give the client the ability to implement a customized configuration of the network connected device.

A discovery service maintains a registry of network connected devices. The registry may be created by polling devices, by devices initiating a registration procedure with the discovery service, by importing a directory of known network connected devices, and the like. In one example embodiment, a "crawl" may be performed by the discovery system to discover and identify network connected devices. For example, a message can be broadcast to network connected devices using a plurality of communication channels and protocols, and the responses from the acknowledging devices can be used to identify the network connected devices. The identified devices can then be requested to provide a device profile, if available, to the discovery service.

In one example embodiment, the directory service is a cloud-based service that provides a single source for the discovery of devices by a variety of client platforms, including personal computers, smartphones, smart watches, tablet computers, and the like. The directory service also registers a variety of network connected devices that utilize different hardware and software platforms via, for example, a published device profile.

In one example embodiment, an agent is installed on the network connected device and the agent registers the device with the directory service on behalf of the device. In one example embodiment, a directory of a conventional system is accessed and imported to discover and register devices known to the conventional system. For example, cellular telephones registered with a directory of a telecommunications provider may be accessed to discover and register the cellular telephones with the directory service.

During the registration process, the network connected device describes itself to the directory service including, for example, the device location, communication address, communication protocol, functional capabilities, and the like. The device may register and advertise itself by means of a device profile, as described more fully below by way of example in conjunction with FIG. 4A.

In one example embodiment, a query for a network connected device may be performed. The query may be a descriptive query comprising one or more terms. Queries may be conducted based on a device type, a type of communication channel (e.g., Internet, WiFi, Bluetooth, and the like), a communication protocol, a language, a device location, a device capability, a user location, a topic (also known as a category, subject, and the like), a required device access credential (e.g., a description of the requirements for attaining access to the network connected device or a requirement that the device be open to the public), and the like. For example, a query reciting "find a traffic camera near exit 22" may be submitted. The query may be parsed and a search engine may search for a network connected device that satisfies the query. In the present example, the search engine may present a list of traffic cameras associated with a plurality of roads having an exit 22. The search engine may learn which traffic camera is likely to be selected by a user based on a history of queries and may use this knowledge in processing future queries. In one example embodiment, queries may be based on the motion of a device. For example, a query may be conducted for buses or taxis moving toward a user or a specified location, or away from a user or a specified location.

FIG. 1 is a block diagram of an example device discovery system 100 for discovering network connected devices, in accordance with an example embodiment. In one example embodiment, the system 100 comprises client devices 104-1, . . . 104-N (collectively known as client devices 104 hereinafter), network connected devices 108-1, . . . 108-N (collectively known as network connected devices 108 hereinafter), a directory system 112, and a network 116. It is noted that a client device 104 may be registered with the directory system 112 and may be treated and provide functionality as a registered network connected device in a manner similar to the network connected devices 108. For example, a smartphone containing a camera may be both a client device 104 for a user and a network connected device 108 for providing access to the smartphone's camera via the network 116.

Each client device 104 may be a personal computer (PC), a tablet computer, a mobile phone, a telephone, a personal digital assistant (PDA), a wearable computing device (e.g., a smartwatch), or any other appropriate computer device. The client device 104 may include a user interface module. In one example embodiment, the user interface module may include a web browser program and/or an application, such as a mobile application, an electronic mail application, a network connected device application, and the like. The network connected device application may, for example, make an internal camera of a smartphone or other information with the network connected device 108 accessible via the directory system 112 and the network 116. Although a detailed description is only illustrated for the client device 104, it is noted that other user devices may have corresponding elements with the same functionality.

Each network connected device 108 may be a PC, a tablet computer, a mobile phone, a telephone, a PDA, a wearable computing device (e.g., a smartwatch), a household appliance, a web camera, industrial equipment, a sensor (such as weather sensors), or any other appropriate computer device. Each network connected device 108 may include a user interface module, a network interface module, and the like. In one example embodiment, the user interface module may include a web browser program and/or an application, such as a weather application, a data processing application, and the like. Each application may pre-process data to be made available by the network connected device 108 via the network 116. For example, the weather application may utilize weather conditions observed by the network connected device 108 to generate a weather report or weather forecast accessible via the network 116. Although a detailed description is only illustrated for the network connected device 108, it is noted that other network connected devices 108 may have corresponding elements with the same functionality.

The directory system 112 discovers and registers the network connected devices 108 and provides a directory service for discovering the network connected devices 108. The directory system 112 maintains a registry (e.g., a directory) of discovered network connected devices 108. The directory system 112 processes a query to identify and locate network connected devices 108 that may be accessed by, for example, the client device 104. In one example embodiment, the directory system 112 learns to process queries based on the historical selections made by various users of network connected devices 108, such as users of the client devices 104. The directory system 112 may be distributed, for example, across a plurality of servers.

The network 116 may be an ad hoc network, a switch, a router, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, another type of network, a network of interconnected networks, a combination of two or more such networks, and the like.

Figure 2:
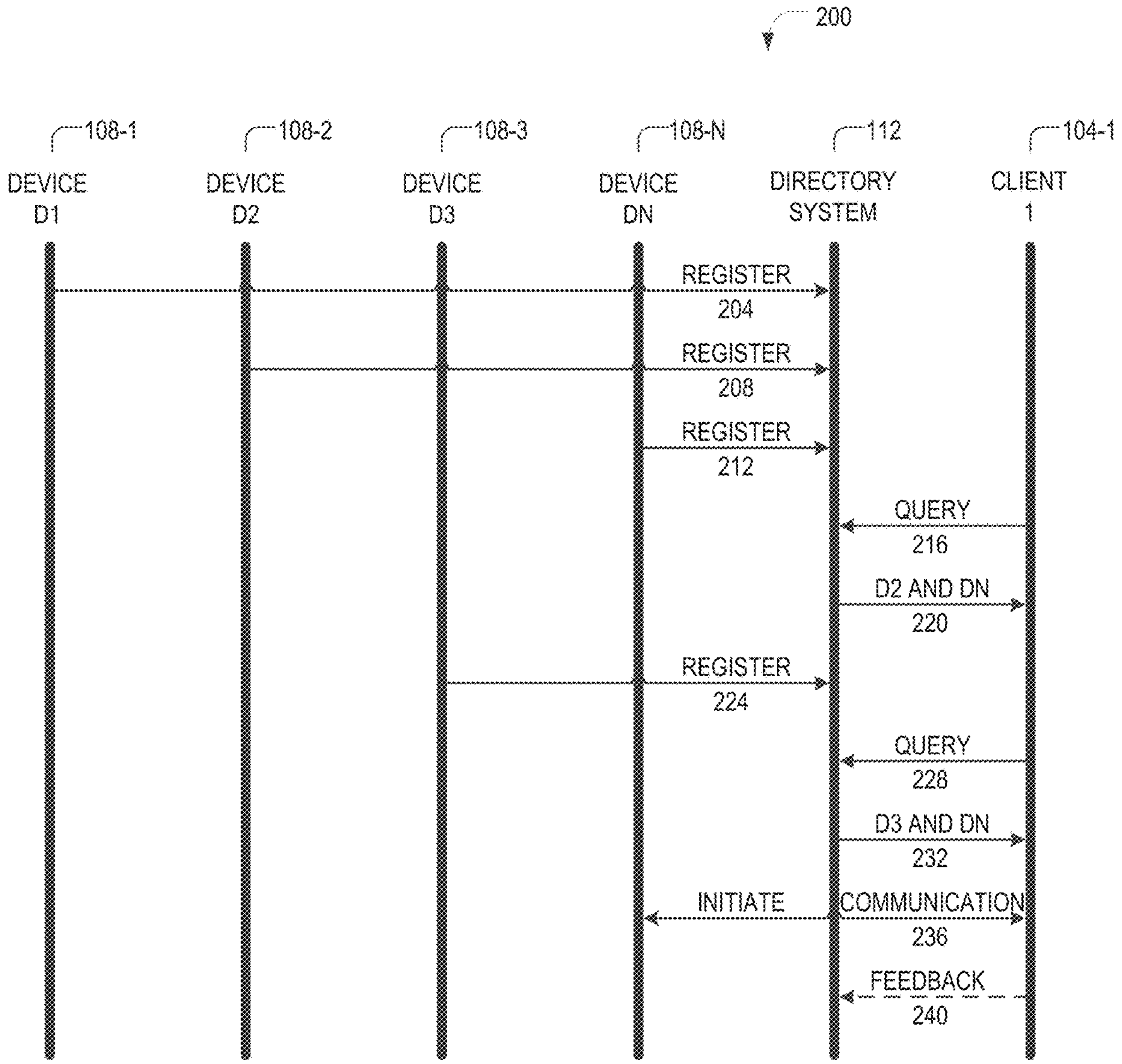
FIG. 2 is an example sequence diagram for registering a network connected device with the directory system and for querying the directory system, according to an example embodiment.

FIG. 2 is an example sequence diagram 200 for registering a network connected device 108 with the directory service of the directory system 112 and for querying the directory service, according to an example embodiment. As illustrated in FIG. 2, a network connected device 108-1 submits a registration request 204 with the directory system 112. In one example embodiment, the registration request 204 includes a device type identifier, a device identifier, or both, and the directory system 112 determines the capabilities of the registering network connected device 108-1 based on the included identifier(s). In one example embodiment, the registration request 204 includes a device profile that includes an identification of the capabilities of the registering network connected device 108. The device profile may include a device identifier, a device type identifier, one or more capabilities, one or more supported communication protocols, a corresponding communication address, and the like. As illustrated in FIG. 2, the network connected devices 108-2, 108-3, and 108-N similarly register using registration requests 208, 224, and 212, respectively.

The client device 104-1 may issue a query request 216 to the directory system 112 to search for a network connected device 108 having, for example, a specified capability, such as a temperature sensing capability. Since the network connected device 108-2 and the network connected device 108-N have temperature sensing capabilities, the directory system 112 sends a query response 220 to the client device 104-1 identifying network connected device 108-2 (D2) and network connected device 108-N (DN). In one example embodiment, the query response 220 contains the device identifiers and communication addresses of the cited network connected devices 108. In one example embodiment, the query response 220 contains the device profiles of the cited network connected devices 108. Each device profile may include, for example, the device identifier and the communication address of the corresponding network connected device 108.

If the query response 220 contains the device profiles of the discovered network connected devices 108, the client device 104-1 may determine the communication protocol(s)

supported by each network connected device 108 by parsing the device profile. If the query response 220 contains only the device identifier and communication address of the corresponding network connected devices 108 and the client device 104-1 is not aware of the supported communication protocols, the client device 104-1 may submit a refined query request 228 specifying, for example, a network connected device 108 with a temperature sensing capability and a Bluetooth and/or any other communication framework (e.g., a HomeKit communication interface used herein merely by way of example). Since the network connected device 108-N has a temperature sensing capability and a HomeKit communication interface, the directory system 112 sends a query response 232 to the client device 104-1 identifying network connected device 108-N. In addition, since the network connected device 108-3 has registered since the initial query request 216 and since the network connected device 108-3 has a temperature sensing capability and a Bluetooth communication interface, the network connected device 108-3 (D3) is identified in the query response 232. The client device 104-1 may then initiate communication 236 with the network connected device 108-N via the HomeKit protocol.

In one example embodiment, the client device 104-1 may submit a feedback response 240 to the directory system 112 indicating that the network connected device 108 identified in the feedback response 240 satisfied the requirements of the query and was selected by the client device 104-1. The directory system 112 may use the feedback response 240 to improve the processing of future queries. For example, a history of queries may be maintained and the network connected device 108 identified in the feedback response 240 may be identified as the network connected device 108 with the highest relevancy for the corresponding query. The network connected device 108 identified in the feedback response 240 may then be registered as the most relevant device in responding to a similar query in the future. Similarly, each network connected device 108 may be assigned a relevancy score that is increased each time the corresponding network connected device 108 is identified in the feedback response 240 and is decreased at a particular time decay rate (to lower the relevancy scores of network connected devices 108 that have not been selected for an extended period of time).

In one example embodiment, if a refinement of the query is not received within a predefined time window, the directory system 112 assumes that the network connected device(s) 108 identified in the query response 232 satisfied the requirements of client device 104-1. The directory system 112 may then rank the selected network connected device 108 higher when processing similar device queries in the future.

Figure 3:
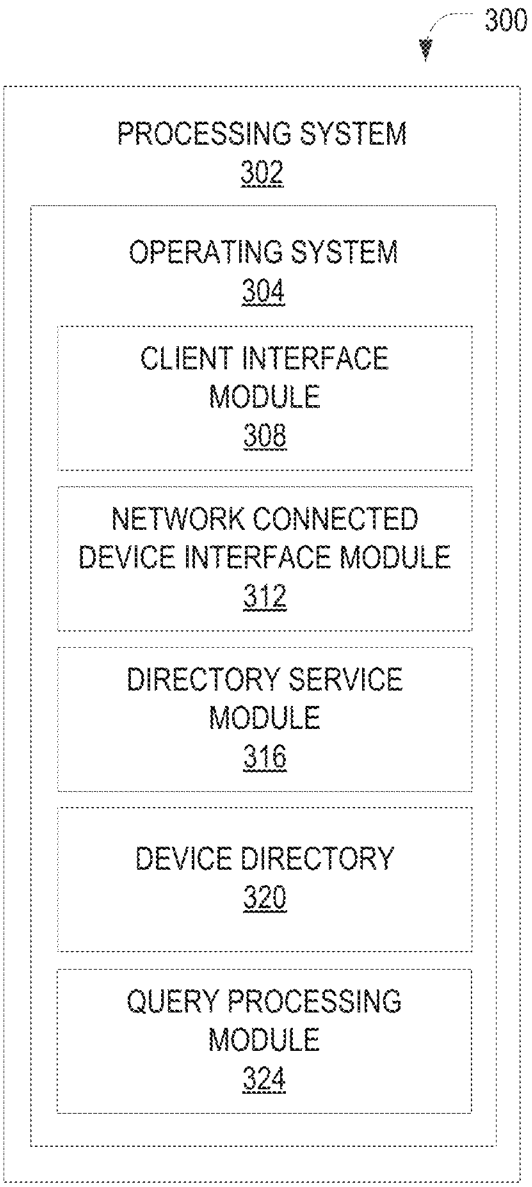
FIG. 3 is a block diagram of an example apparatus for implementing a directory system, in accordance with an example embodiment.

FIG. 3 is a block diagram of an example apparatus 300 for implementing a directory system 112, in accordance with an example embodiment. The apparatus 300 is shown to include a processing system 302 that may be implemented on a client or other processing device, and that includes an operating system 304 for executing software instructions.

In accordance with an example embodiment, the apparatus 300 may include a client interface module 308, a network connected device interface module 312, a directory service module 316, a device directory 320, and a query processing module 324.

The client interface module 308 receives query requests and feedback responses from the client devices 104 and forwards the requests to the directory service module 316. The client interface module 308 receives query responses from the directory service module 316 and forwards the responses to the requesting client device 104. The network connected device interface module 312 receives registration requests from the network connected devices 108 and forwards the requests to the directory service module 316. The network connected device interface module 312 receives registration confirmations from the directory service module 316 and forwards the registration confirmations to the requesting network connected devices 108.

The directory service module 316 registers network connected devices 108 and maintains the device directory 320. The query processing module 324 processes query requests received from, for example, the client devices 104 and determines the identity of network connected devices 108 that satisfy the query. The query processing module 324 learns to process device queries based on the historical selections of network connected devices 108 made by various users.

The device directory 320 comprises, for example, a table with a row for each registered network connected communication device 108. Each row may contain a device identifier, a device type identifier, one or more device capabilities, one or more supported communication protocols, a corresponding communication address, and the like. If a device profile is available, all or a portion of the information contained in the device profile may be maintained in the row for the corresponding network connected device 108.

Figures 4A, 4B:
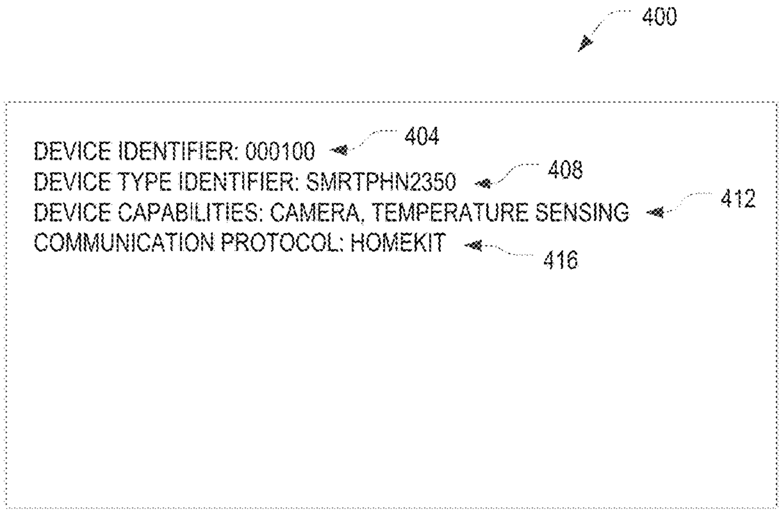
FIG. 4A is an example device profile, according to an example embodiment.
FIG. 4B is an example device directory, according to an example embodiment.

FIG. 4A is an example device profile 400, according to an example embodiment. The device profile 400 may include a device identifier 404, a device type identifier 408, one or more device capabilities 412, and one or more supported communication protocols and corresponding communication addresses 416. In one example embodiment, the device profile 400 includes authorization criteria, such as criteria for accessing the corresponding network connected device 108. For example, the authorization criteria may indicate that a user must register with the network connected device 108, must be authorized to access the network connected device 108, must obtain a subscription service to the network connected device 108, must pay a fee for accessing the network connected device 108, and the like.

FIG. 4B is an example device directory 320, according to an example embodiment. The device directory 320 comprises a row 454 for each registered network connected device 108. Each row 454 may contain all or a portion of the information contained in the device profile 400 for the corresponding network connected device 108. For example, column 458 contains the device identifier 404 for the corresponding network connected device 108, column 462 contains the device type identifier 408 for the corresponding network connected device 108, column 466 identifies the device capabilities 412 for the corresponding network connected device 108, column 470 identifies the supported communication protocols for the corresponding network connected device 108, and column 474 identifies the communication address(es) for the corresponding network connected device 108. In one example embodiment, an additional column (not shown) contains the authorization criteria for the corresponding network connected device 108.

Figure 5A:
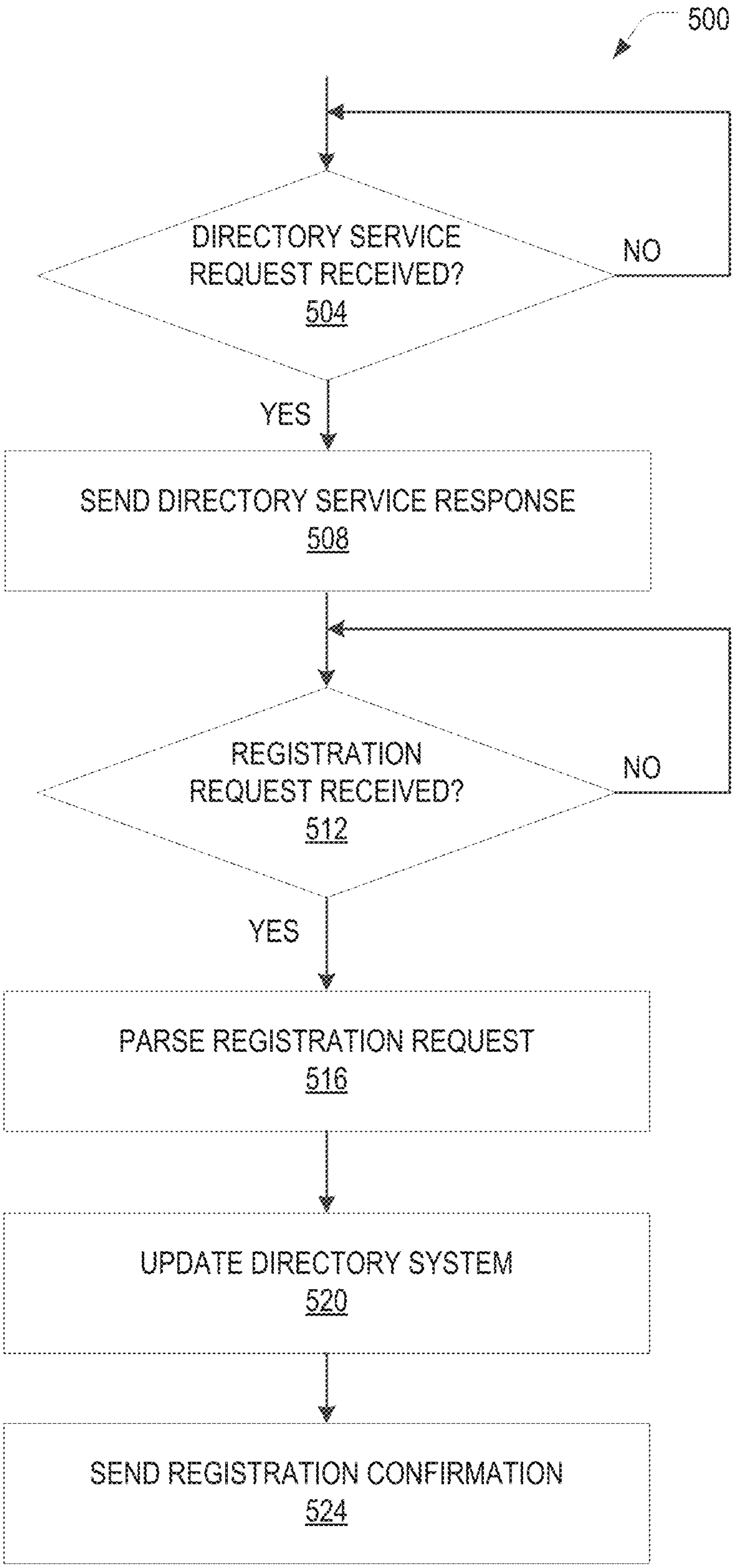
FIG. 5A is a flowchart for an example method for registering a network connected device with the directory system, according to an example embodiment.

FIG. 5A is a flowchart for an example method 500 for registering a network connected device 108 with the directory system 112, according to an example embodiment. In one example embodiment, the method 500 is performed by the directory service module 316.

In one example embodiment, a check for a broadcast of a directory service request is performed (operation 504). For example, a network connected device 108 may broadcast a request to locate and identify a directory service, such as the directory service offered by the directory system 112. If a directory service request is not received, the method 500 repeats operation 504; otherwise, a directory service response is sent to the requesting network connected device 108 indicating the existence and identity of the directory service (operation 508).

A check for a directory registration request is performed (operation 512). For example, a network connected device 108 may submit a device profile to the directory service offered by the directory system 112. If a directory registration request is not received, the method 500 proceeds repeats operation 512; otherwise, the directory registration request is parsed to identify the capabilities, communication address(es), and the like of the network connected device 108 as indicated, for example, by the device profile (operation 516). The device directory of the directory system 112 is updated with the characteristics of the registering network connected device 108, such as the capabilities, the communication address(es), and the like (operation 520).

A registration confirmation is sent to the registering network connected device 108 confirming registration of the network connected device 108 with the directory service (operation 524). The method 500 then ends.

Figure 5B:
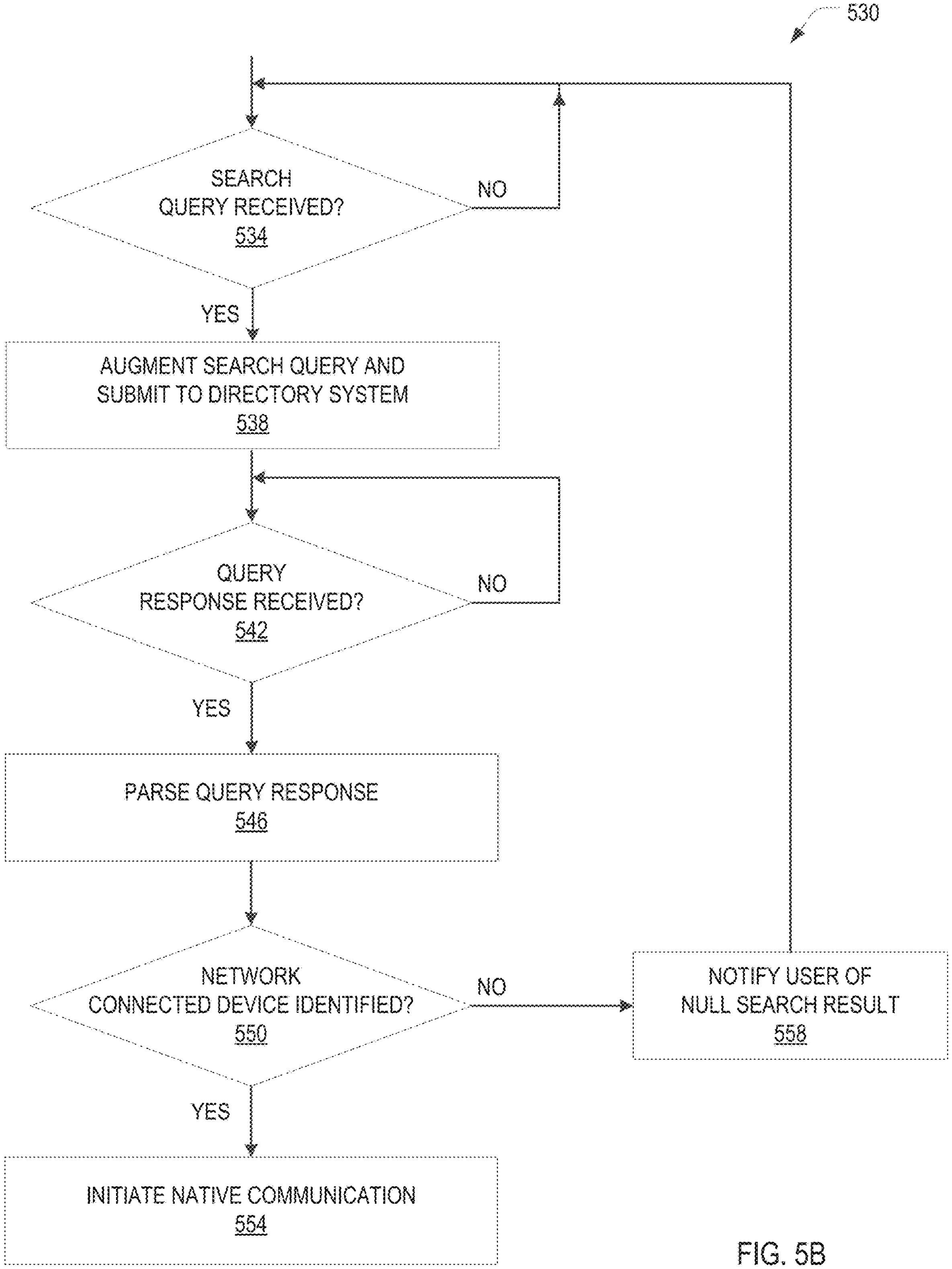
FIG. 5B is a flowchart for an example method for querying a directory system, according to an example embodiment.

FIG. 5B is a flowchart for an example method 530 for querying a directory system 112, according to an example embodiment. In one example embodiment, the method 530 is performed by the client device 104-1.

In one example embodiment, a check is performed to determine if a search query is received from a user (operation 534). For example, a user may submit a request for the temperature at a specified geographic location defined, for example, by a street address, latitude/longitude coordinates, and the like. The user may submit a request for a network connected device 108 having a temperature sensing capability at a specified geographic location.

If a search query is not received, the method 530 repeats operation 534, otherwise, the search query is submitted to the directory system 112 (operation 538). In one example embodiment, the query may be augmented with additional search terms. For example, if the entity submitting the query, such as the client device 104-1, is only capable of communicating with the networked connected device 108 via the Bluetooth wireless technology standard and the HomeKit communication protocol, the query may be augmented with terms identifying the cited protocols. If a location is specified in the query as a street address, the latitude/longitude coordinates corresponding to the street address may be included in the search query.

A check is performed to determine if a query response has been received (operation 542). If a query response has not been received, the method 530 repeats operation 542; otherwise, the query response is parsed (operation 546) and a check is performed to determine if a networked connected device 108 that satisfies the search query has been identified (operation 550). If a suitable networked connected device 108 has been identified, the method 530 proceeds with operation 554; otherwise, the user is notified that a suitable networked connected device 108 has not been identified (operation 558) and the method 530 proceeds with operation 534 to determine if a refined query is received.

During operation 554, a native communication 236 may be initiated to request and obtain information from the network connected device. The method 530 then ends.

Figure 5C:
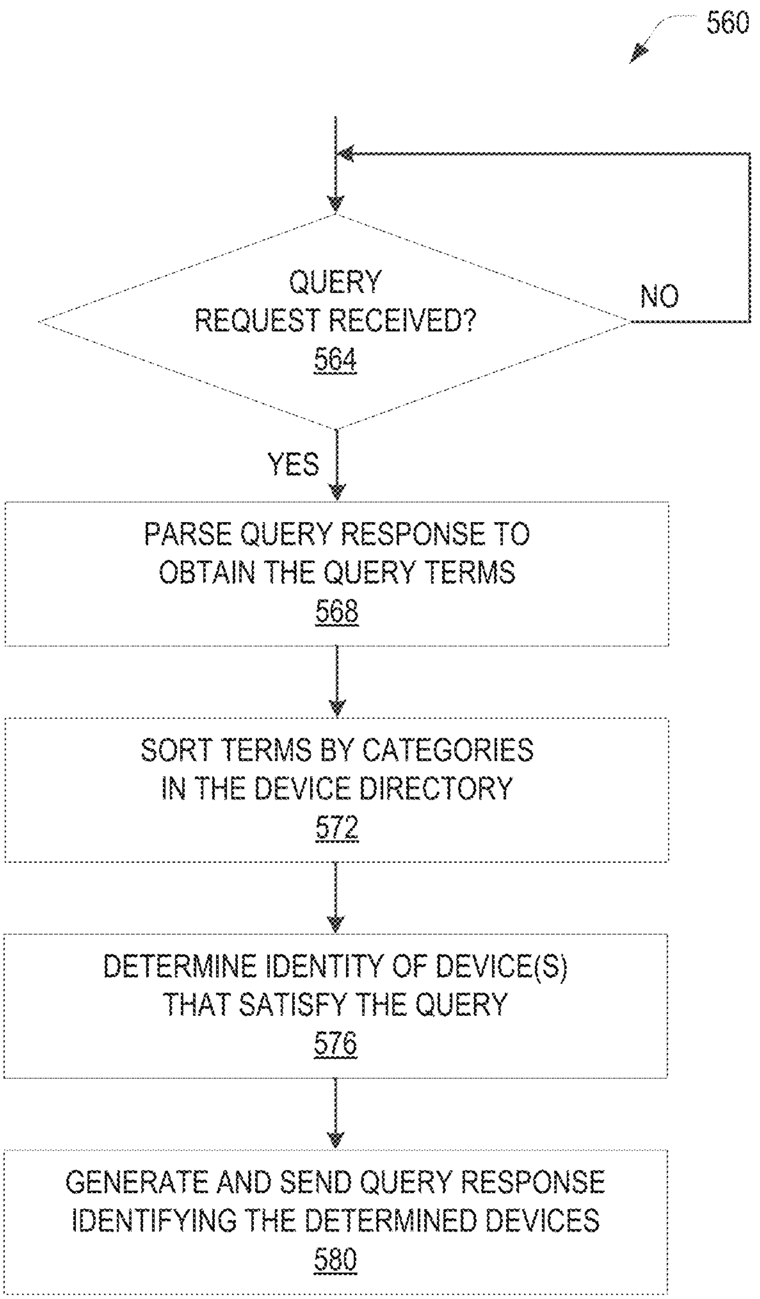
FIG. 5C is a flowchart for an example method for processing a device query, according to an example embodiment.

FIG. 5C is a flowchart for an example method 560 for processing a device query, according to an example embodiment. In one example embodiment, the method 560 is performed by the query processing module 324.

In one example embodiment, a check for a received query request is performed (operation 564). For example, the client device 104 may submit a query request to the directory service offered by the directory system 112. If a query request is not received, the method 560 repeats operation 564; otherwise, the query request is parsed to obtain the query terms (operation 568).

In one example embodiment, the terms are sorted by the categories defined in the device directory 450, such as location, capability, topic, and the like (operation 572). For example, a street address in the query may be sorted as a location and mapped to the location parameter of the device directory 320 (such as mapped to latitude and longitude coordinates for the street address).

The network connected device(s) 108 that most closely satisfy the query are determined (operation 576). For example, a nearest neighbor algorithm may be used to identify the network connected devices 108 that have parameters most closely matching the terms of the query. A query response containing the identity of the identified network connected devices 108 is generated and sent to the requesting network connected device 108 (operation 580). In one example embodiment, the query response contains the profiles of the identified network connected devices 108. The method 560 then ends.

Figure 6:
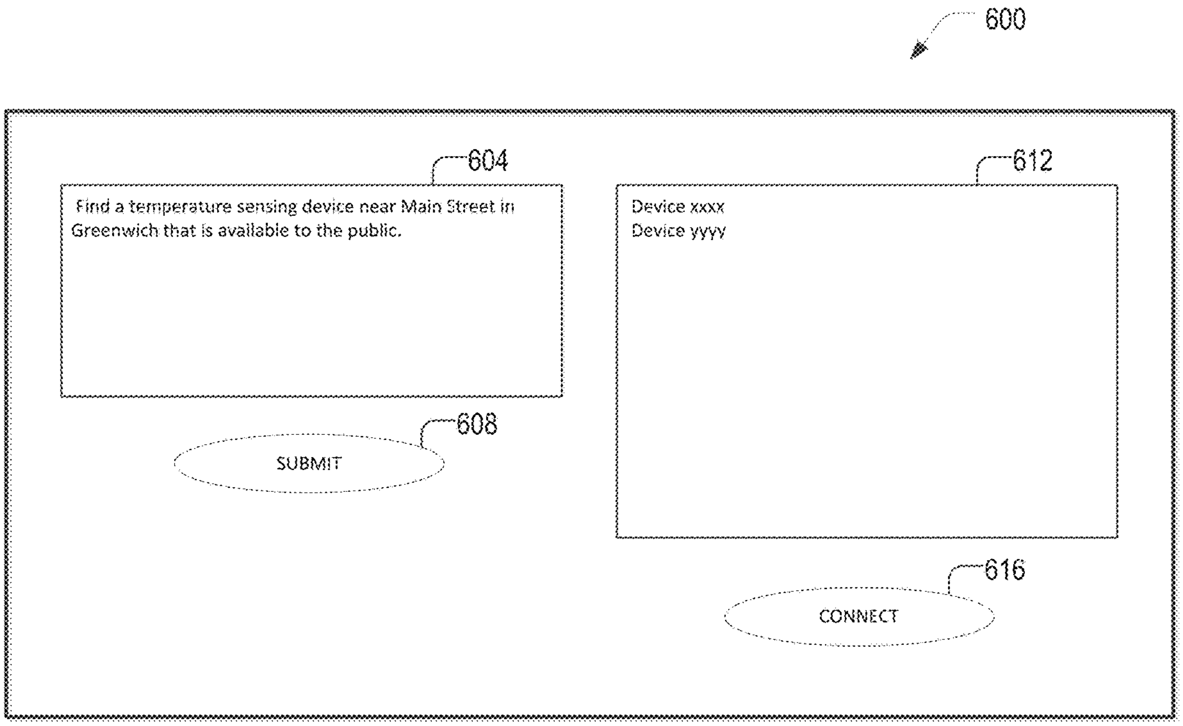
FIG. 6 is an example user interface for querying the directory system, according to an example embodiment.

FIG. 6 is an example user interface 600 for querying the directory system 112, according to an example embodiment. In one example embodiment, the user interface 600 is provided by the client device 104-1.

The user interface 600 includes a search entry field 604 where a descriptive query, such as a text-based query, may be entered. A query submit button 608 may be selected by a user to forward the query to the directory system 112. In response, a search for a network connected device 108 having a temperature sensing capability, no access restrictions, and a location near Main Street in Greenwich is conducted. A query response window 612 displays the identity of the network connected device(s) 108 that satisfies the descriptive query. A user may select one or more of the identified network connected devices 108 and select the initiate connection button 616 to connect to the selected network connected device 108.

Figure 7:
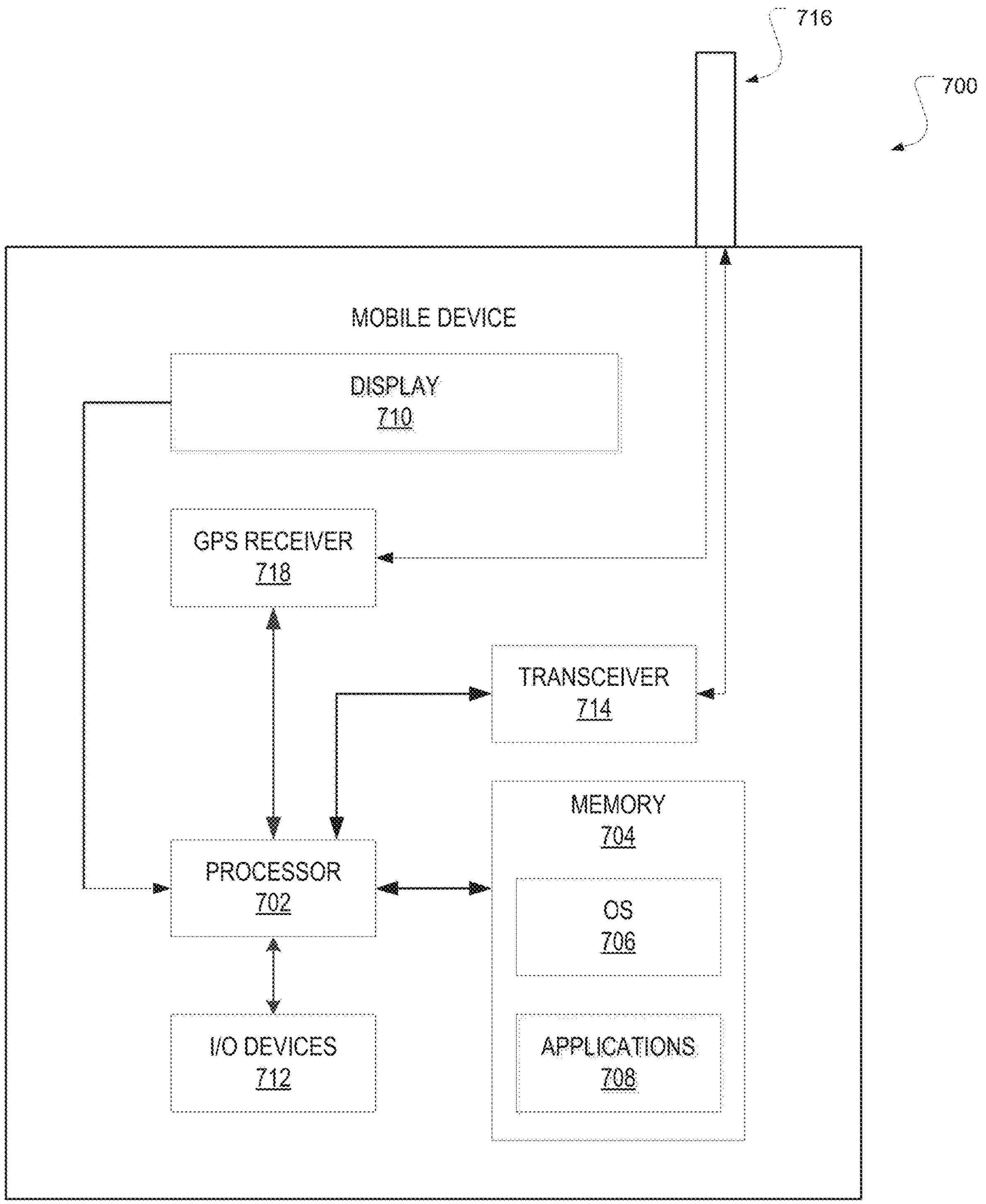
FIG. 7 is a block diagram illustrating a mobile device, according to an example embodiment.

FIG. 7 is a block diagram illustrating a mobile device 700, according to an example embodiment. The mobile device 700 can include a processor 702. The processor 702 can be any of a variety of different types of commercially available processors suitable for mobile devices 700 (for example, an XScale architecture microprocessor, a microprocessor without interlocked pipeline stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as applications 708, such as a mobile location enabled application that can provide location-based services (LBSs) to a user. The processor 702 can be coupled, either directly or via appropriate intermediary hardware, to a display 710 and to one or more input/output (I/O) devices 712, such as a keypad, a touch panel sensor, and a microphone. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a global positioning system (GPS) receiver 718 can also make use of the antenna 716 to receive GPS signals.

Figure 8:
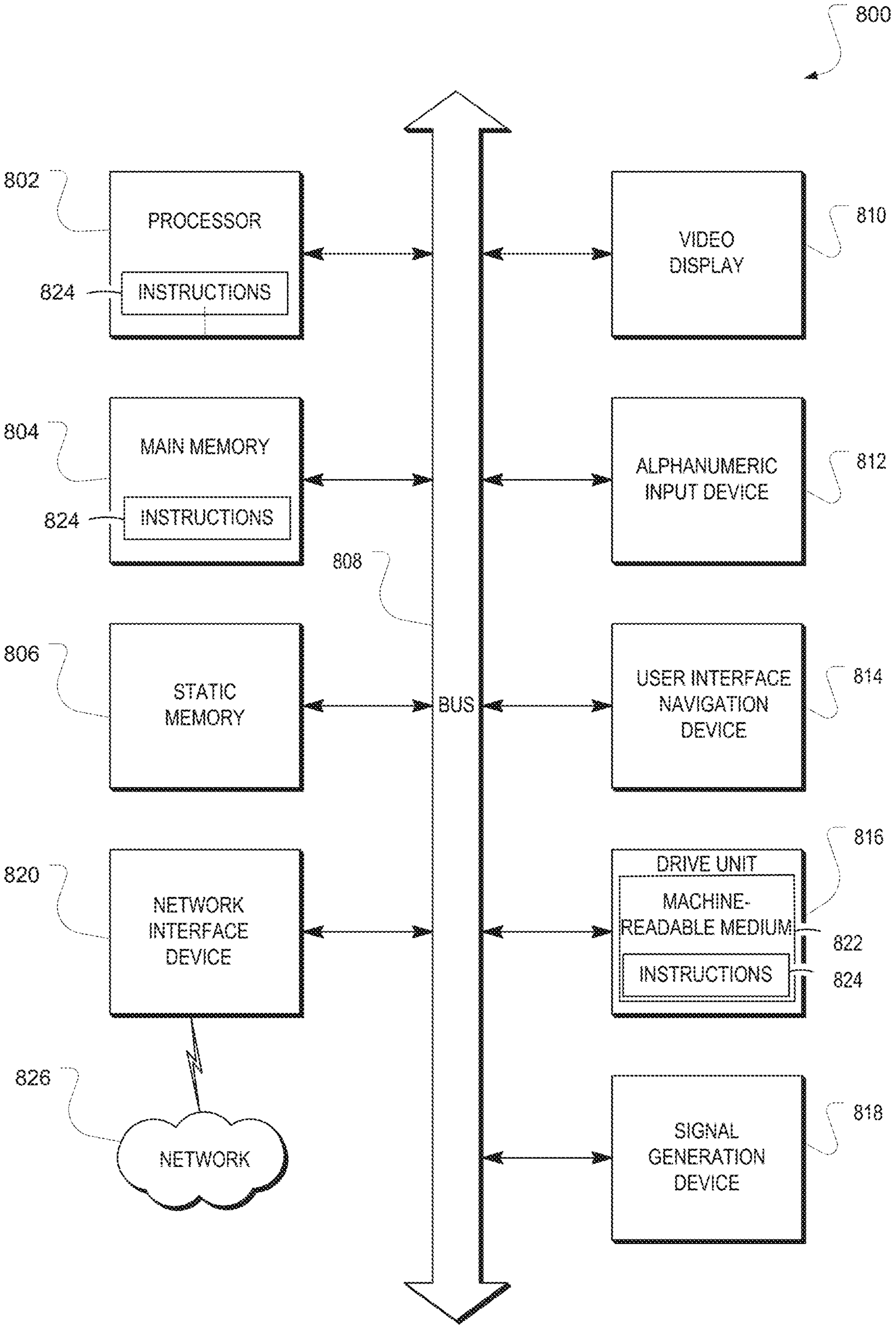
FIG. 8 is a block diagram of a computer processing system within which a set of instructions may be executed for causing a computer to perform any one or more of the methodologies discussed herein.

FIG. 8 is a block diagram of a computer processing system 800 within which a set of instructions 824 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a PC, a tablet PC, a PDA, a cellular telephone, or any processing device capable of executing a set of instructions 824 (sequential or otherwise) that specify actions to be taken by that device. Further, while only a single computer is illustrated, the term "computer" shall also be taken to include any collection of computers that, individually or jointly, execute a set (or multiple sets) of instructions 824 to perform any one or more of the methodologies discussed herein.

The example computer processing system 800 includes a processor 802 (e.g., a central processing unit (CPU), a graphics processing unit (GPU), or both), a main memory 804, and a static memory 806, which communicate with each other via a bus 808. The computer processing system 800 may further include a video display 810 (e.g., a plasma display, a liquid crystal display (LCD), or a cathode ray tube (CRT)). The computer processing system 800 also includes an alphanumeric input device 812 (e.g., a keyboard), a user interface (UI) navigation device 814 (e.g., a mouse and/or touch screen), a drive unit 816, a signal generation device 818 (e.g., a speaker), and a network interface device 820.

The drive unit 816 includes a machine-readable medium 822 on which is stored one or more sets of instructions 824 and data structures embodying or utilized by any one or more of the methodologies or functions described herein. The instructions 824 may also reside, completely or at least partially, within the main memory 804, the static memory 806, and/or within the processor 802 during execution thereof by the computer processing system 800, the main memory 804, the static memory 806, and the processor 802 also constituting tangible machine-readable media 822.

The instructions 824 may further be transmitted or received over a network 826 via the network interface device 820 utilizing any one of a number of well-known transfer protocols (e.g., Hypertext Transfer Protocol).

While the machine-readable medium 822 is shown, in an example embodiment, to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding, or carrying a set of instructions 824 for execution by the computer and that cause the computer to perform any one or more of the methodologies of the present application, or that is capable of storing, encoding, or carrying data structures utilized by or associated with such a set of instructions 824. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for discovering interrelated computing devices, the method comprising:

receiving, from a client device and via a network, a semantic query identifying one or more capabilities of a desired network connected device;

parsing, using at least one hardware processor, the semantic query for a network connected device to determine a set of query terms;

matching a first query term of the set of query terms to a first column of a device directory table, the device directory table comprising a plurality of rows corresponding to network connected devices and a plurality of columns corresponding to network connected device properties, the plurality of columns comprising the first column;

selecting, using at least one hardware processor, a network connected device based at least in part on the parsed semantic query and based at least in part on a device profile of the network connected device, the device profile describing a set of capabilities of the network connected device, the selecting based at least in part on a difference between the first query term and a first network connected device property associated with the first column;

identifying, using at least one hardware processor, a network address of the network connected device using the device directory table; and providing to the client device via the network a query response, the query response identifying the network address of the network connected device and including the device profile, the client device to initiate a communication with the network connected device.

2. The computerized method of claim 1, further comprising sorting one or more terms derived from the parsed semantic query based on one or more categories defined in a device di rectory.

3. The computerized method of claim 1, wherein the query response comprises a device profile corresponding to at least one of the network connected devices, the device profile identifying a capability and a network address of the network connected device.

4. The computerized method of claim 1, wherein the semantic query specifies a physical location of the desired network connected device.

5. The computerized method of claim 1, wherein the semantic query specifies a communication protocol or type of communication channel supported by the desired network connected device.

6. The computerized method of claim 1, wherein the semantic query specifies authorization criteria.

7. The computerized method of claim 1, further comprising registering an unregistered network connected device using a crawling technique.

8. The computerized method of claim 7, wherein the registration is performed in part by an agent on the unregistered network connected device.

9. The computerized method of claim 1, further comprising importing a directory of known network connected devices.

10. The computerized method of claim 1, wherein a capability is one of information processing, environmental monitoring, industrial equipment control, a vehicle location service, and household appliance monitoring and control.

11. The computerized method of claim 1, wherein each interrelated computing device is network addressable via an Internet protocol (IP) address.

12. The computerized method of claim 1, wherein the parsing of the semantic query performs semantic textual analysis to determine the one or more capabilities.

13. An apparatus comprising:

one or more hardware processors;

memory to store instructions that, when executed by the one or more hardware processors perform operations comprising:

receiving, from a client device via a network, a semantic query identifying one or more capabilities of a desired network connected device;

parsing the semantic query for a network connected device to determine a set of query terms;

matching a first query term of the set of query terms to a first column of a device directory table, the device directory table comprising a plurality of rows corresponding to network connected devices and a plurality of columns corresponding to network connected device properties, the plurality of columns comprising the first column;

selecting a network connected device based at least in part on the parsed semantic query and based at least in part on a device profile of the network connected device, the device profile describing a set of capabilities of the network connected device, the selecting based at least in part on a difference between the first query term and a first network connected device property associated with the first column;

identifying a network address of the network connected device using the device directory table; and providing to the client device via the network a query response, the query response identifying the network address of the network connected device and including the device profile, the client device to initiate a communication with the network connected device.

14. The apparatus of claim 13, the operations further comprising sorting one or more terms derived from the parsed semantic query based on one or more categories defined in a device directory.

15. The apparatus of claim 13, wherein the query response comprises a device profile corresponding to at least one of the network connected devices, the device profile identifying a capability and a network address of the network connected device.

16. The apparatus of claim 13, the operations further comprising registering an unregistered network connected device using a crawling technique.

17. The apparatus of claim 16, wherein the registration is performed in part by an agent on the unregistered network connected device.

18. The apparatus of claim 13, the operations further comprising importing a directory of known network connected devices.

19. The apparatus of claim 13, wherein the parsing of the semantic query performs semantic textual analysis to determine the one or more capabilities.

20. A non-transitory machine-readable storage medium comprising instructions, which when implemented by one or more machines, cause the one or more machines to perform operations comprising:

receiving, from a client device and via a network, a semantic query identifying one or more capabilities of a desired network connected device to determine a set of query terms;

parsing the semantic query for a network connected device;

matching a first query term of the set of query terms to a first column of a device directory table, the device directory table comprising a plurality of rows corresponding to network connected devices and a plurality of columns corresponding to network connected device properties, the plurality of columns comprising the first column;

selecting a network connected device based at least in part on the parsed semantic query and based at least in part on a device profile of the network connected device, the device profile describing a set of capabilities of the network connected device, the selecting based at least in part on a difference between the first query term and a first network connected device property associated with the first column;

identifying a network address of the network connected device using the device directory table; and providing to the client device via the network a query response, the query response identifying the network address of the network connected device and including the device profile, the client device to initiate a communication with the network connected device.

* * * * *